Oct. 10, 1961    T. H. KERRY    3,003,316
COOLING MEANS FOR FORKED EXHAUST DUCTS OF GAS TURBINE ENGINES
Filed Feb. 9, 1954    6 Sheets-Sheet 1

Inventor
Thomas Henry Kerry
By Leech and Radue
Attorneys

Oct. 10, 1961     T. H. KERRY     3,003,316
COOLING MEANS FOR FORKED EXHAUST DUCTS OF GAS TURBINE ENGINES
Filed Feb. 9, 1954     6 Sheets-Sheet 4

Inventor
Thomas Henry Kerry
By Leech and Rachur
Attorneys

INVENTOR
THOMAS HENRY KERRY
BY Fred. E. Shoemaker
Fred L. Witherspoon, Jr.
ATTORNEYS United States Patent Office 3,003,316
Patented Oct. 10, 1961

3,003,316
COOLING MEANS FOR FORKED EXHAUST DUCTS
OF GAS TURBINE ENGINES
Thomas Henry Kerry, Derby, England, assignor to Rolls-Royce Limited, Derby, England, a British company
Filed Feb. 9, 1954, Ser. No. 409,187
Claims priority, application Great Britain Feb. 10, 1953
5 Claims. (Cl. 60—39.66)

This invention is for cooling devices for the exhaust ducts or jet pipes of gas turbine engines and applies to those exhaust assemblies where a stream of exhaust gases flow through a duct which is forked to form a pair of ducts. Examples of such arrangement are shown in British Letters Patent 585,557 and U.S.A. Patent No. 2,641,422.

In such assemblies at the commencement of the bifurcation some of the gases will impinge on a narrow piece (or pieces) of metal forming the junction and the effect of this may be to cause local distortion or break down.

According to this invention there are provided means for cooling said junction comprising conduit means connected at one end to a source of cooling air, and having a part upstream of and adjacent said junction, whereby said cooling air is caused to flow over said junction.

The cooling air may be led in direct from the compressor of the gas turbine engine or, in the case of a by-pass engine, may be derived from the by-pass duct, that is to say from air compressed by the low-pressure part of the compressor which by-passes the combustion equipment and turbines, and may be discharged direct to atmosphere or into the turbine exhaust.

Thus in an arrangement where the stream flows initially through a cylindrical pipe and is divided between two cylindrical pipes, the junction between the latter which forms part of the wall of each may assume the shape of an arc of a circle. Immediately upstream of and covering this may be arranged a similarly shaped muff or conduit into the ends of which cooling air is admitted and from openings in the rear of which the air is discharged. The open ends of this conduit may be arranged to trap some of the by-pass air flowing along the inner walls of the undivided exhaust pipe.

In an arrangement where the gases are initially flowing in an annular passageway and led from there into two cylindrical ducts, there will be two junctions of the latter in the annulus 180 degrees apart and at these points there may be formed boxes or muffs, V-shaped in cross section to which air is admitted from the compressor near the apex of the V and discharged from opening of the V backward into the two dividing pipes.

Three examples of this invention are illustrated diagrammatically in the accompanying drawings.

Figure 12:
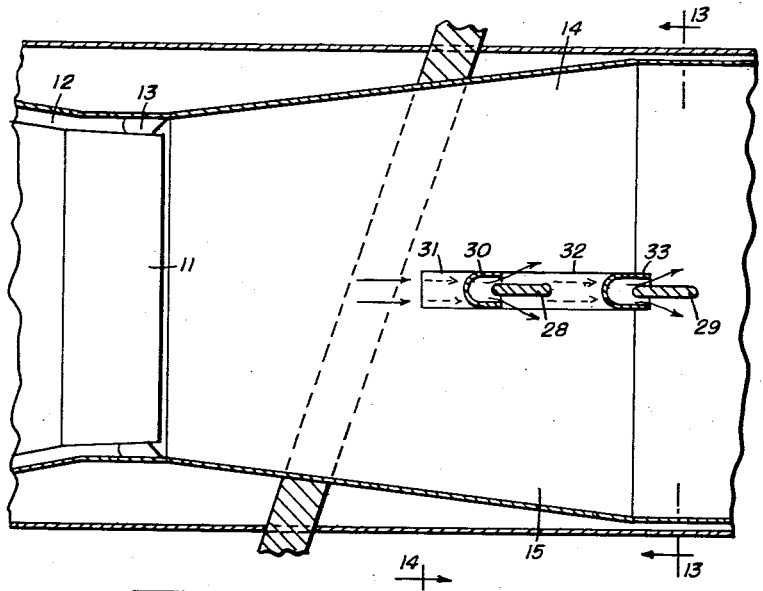
Figure 13:
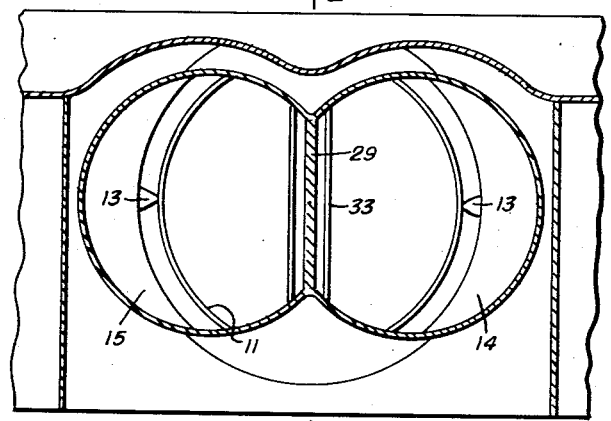
Figure 14:
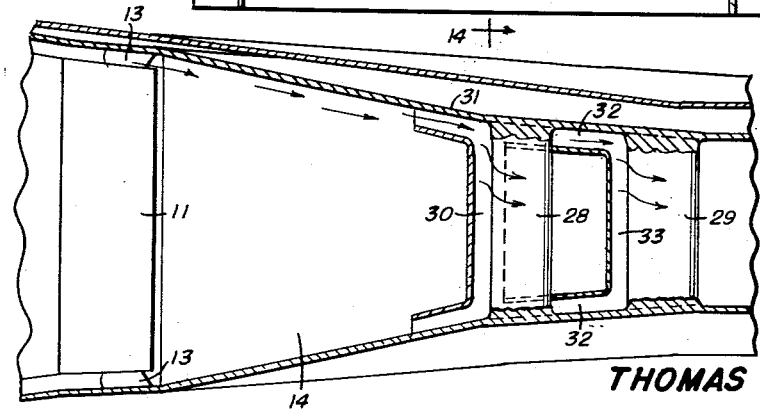

FIGURES 12 to 14, inclusive illustrate an arrangement where the discharge pipe is hour glass shaped.

In the arrangement shown in FIGURES 1 to 5, FIGURE 1 (which is on a smaller scale than the rest of the drawings) shows the general arrangement of a by-pass engine and jet pipe.

Figure 2:
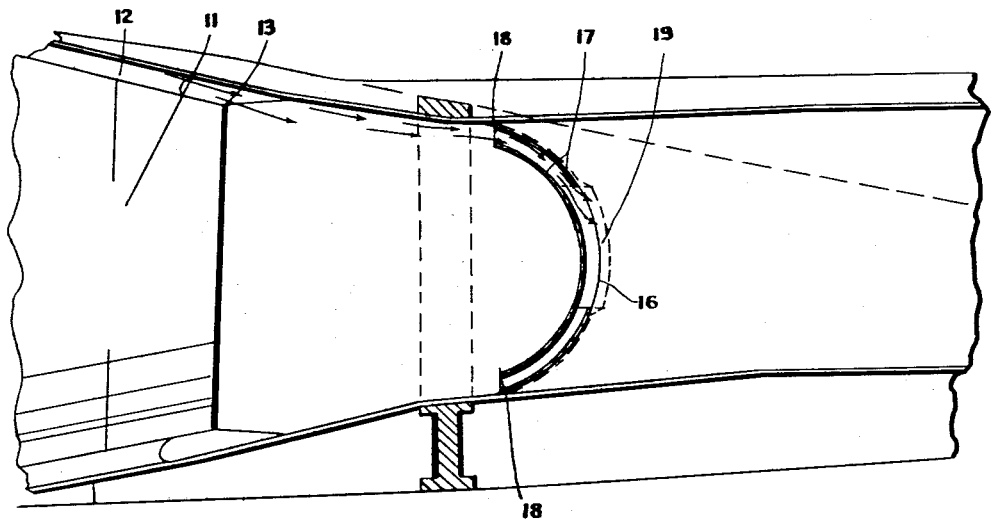

FIGURE 2 shows in vertical section the exhaust duct, or jet pipe, at the point of division.

Figure 3:
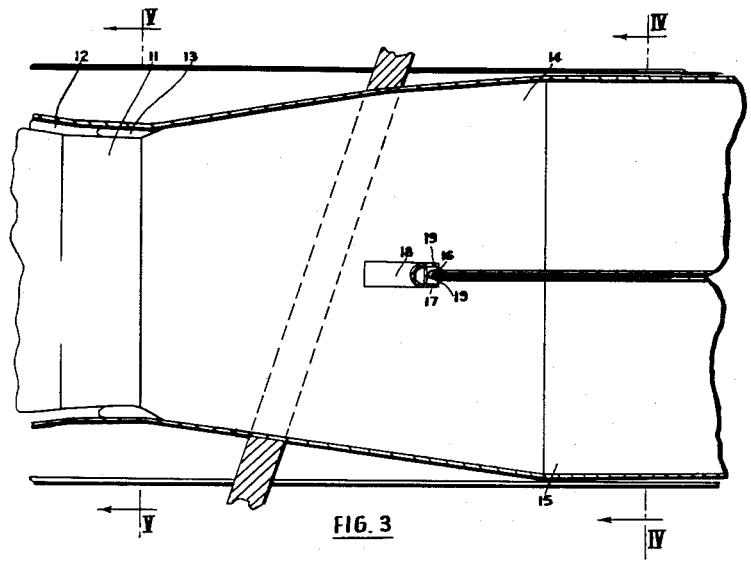

FIGURE 3 is a section at right angles to FIGURE 2.

Figure 4:
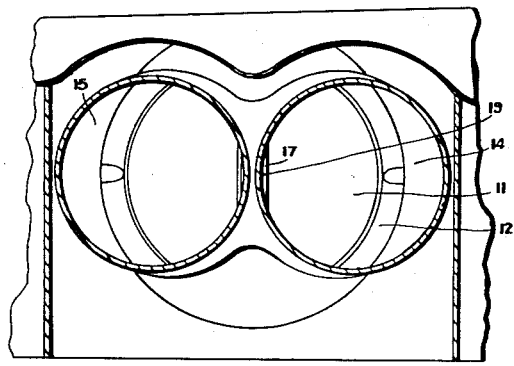
Figure 5:
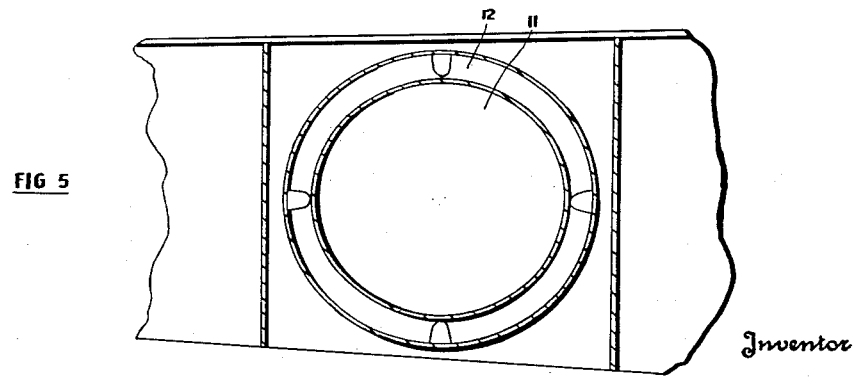

FIGURES 4 and 5 are sections on the lines IV—IV and V—V of FIGURE 3.

Figure 6:
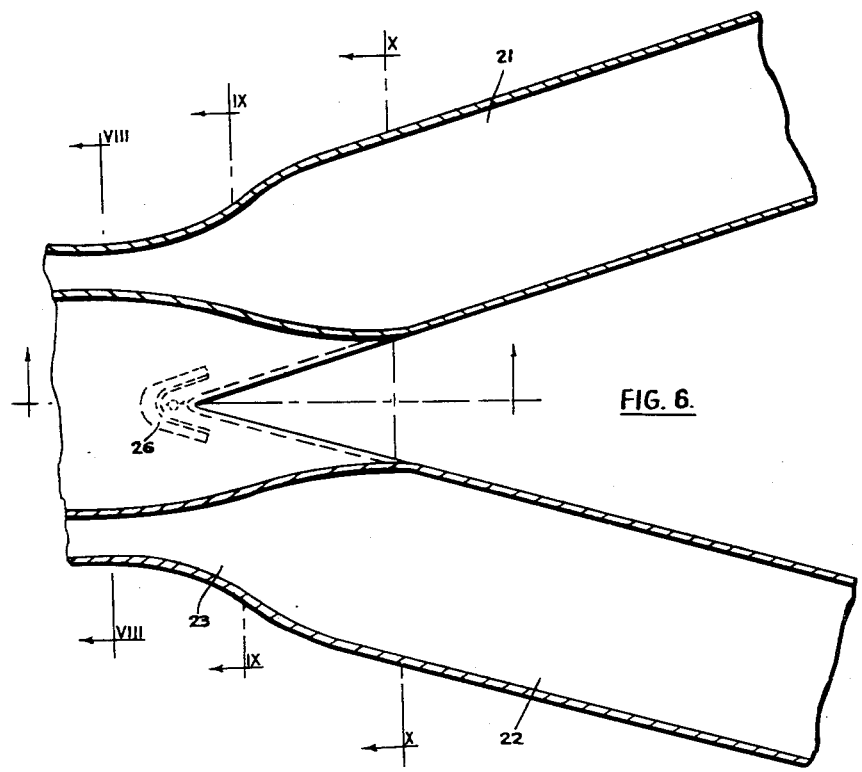
FIGURES 6 to 11 illustrate an arrangement in which the gases flow initially in an annular stream (as in British Patent 585,557).

FIGURE 6 is a horizontal section of an arrangement where the gases are initially in an annular stream.

Figure 7:
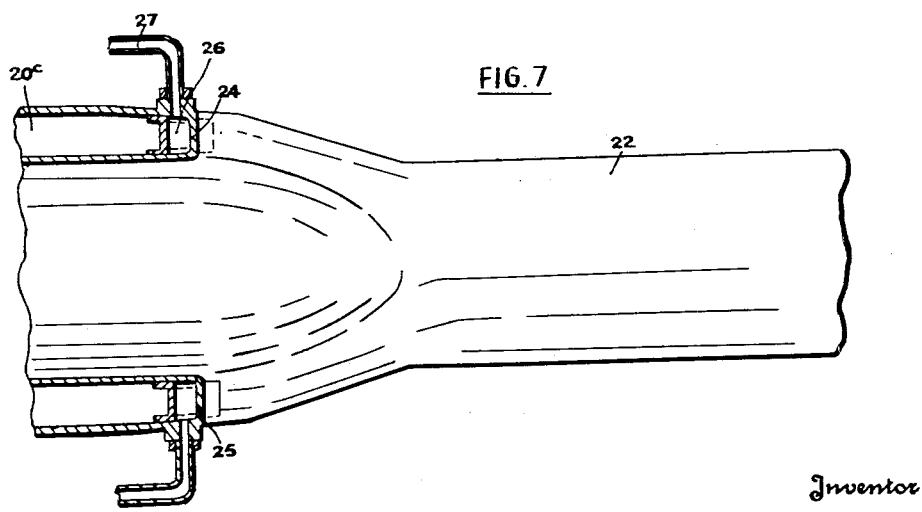
Figure 8:
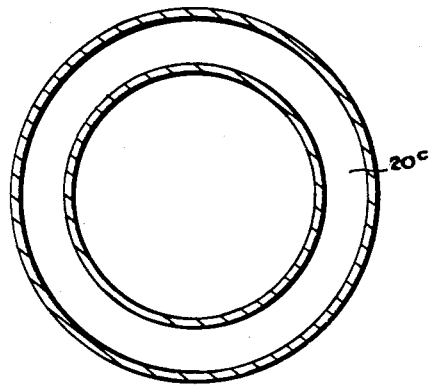
Figure 9:
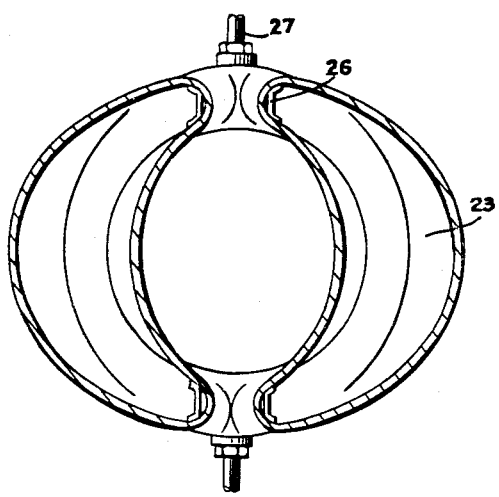
Figure 10:
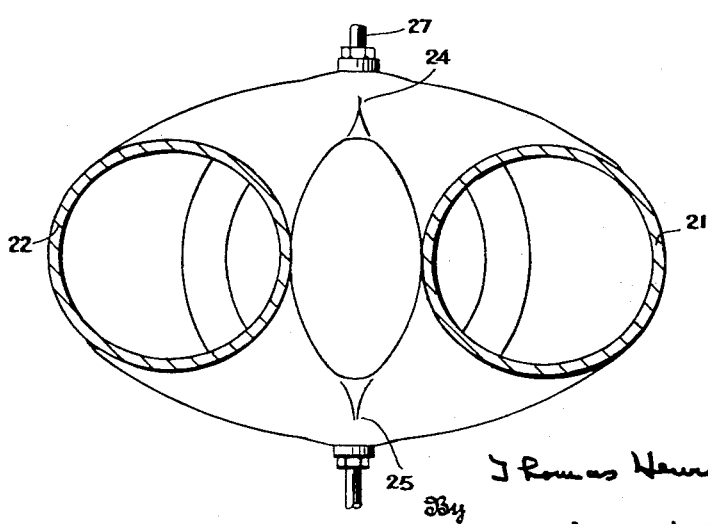

FIGURE 7 is a section at right angles to FIGURE 6 and FIGURES 8, 9 and 10 are sections on the lines VIII—VIII, IX—IX, and X—X of FIGURE 6.

Figure 11:
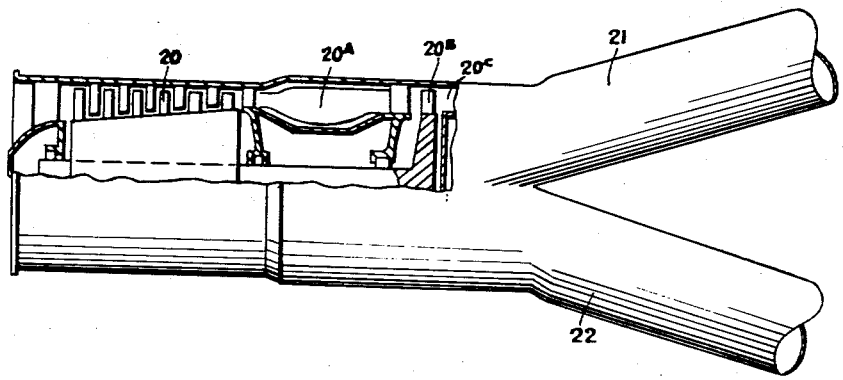

FIGURE 11 is a plan partly in section on a smaller scale showing the arrangement illustrated in FIGURES 6 to 10 and diagrammatically the engine which the exhaust system serves.

FIGURE 12 is a view corresponding to FIGURE 3 of an "hour-glass" type of jet pipe.

FIGURE 13 is a cross-section on the line XIII—XIII of FIG. 12; and

FIGURE 14 is a longitudinal section on the line XIV—XIV of FIGURE 13.

Figure 1:
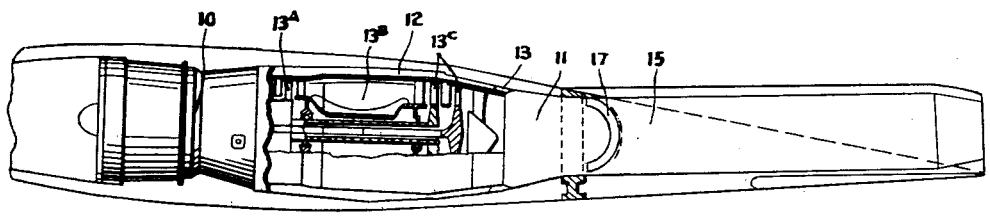
FIGURES 1 to 5 illustrate an arrangement where the gases flow initially in a cylindrical stream (as in U.S.A. Patent No. 2,641,422).

In FIGURE 1, 10 is a gas turbine engine of the by-pass type, the main exhaust passageway being shown at 11 and the by-pass annular passageway at 12 communicating with the main passageway at outlet 13.

The engine comprises an axial compressor 13A some part of the air from which flows through the by-pass passageway 12. The main part flows through flame tubes 13B to drive turbines 13C when it exhausts into main passageway 11.

The main exhaust duct 11 is divided into two ducts 14 and 15, the forward junction of the two walls at 16 being shaped as the arc of a circle when viewed in vertical section. At this point and immediately upstream of it is arranged an arc-shaped conduit or muff 17 with open ends 18 arranged so that part of the by-pass air, which at this point is flowing as an annulus along the walls of the main passageway 11, will enter the conduit 17 and will be discharged again back into the stream of gases through one or more openings in the rear of conduit 17, these openings being shown at 19. By this means the exhaust duct at the point of division of the gases is cooled.

The open ends 18 of conduit 17 might be carried forward if desired nearer or into the outlet 13 of the by-pass duct 12.

In the example shown in FIGURES 6 to 11 the compressor 20 (FIGURE 11) supplies air under pressure to flame tube 20A to drive turbine 20B and exhaust into annular passageway 20C whence the exhaust gases pass into two cylindrical ducts 21 and 22. The transition stage from the annular to the cylindrical is kidney-shaped—see FIGURE 9. These kidney shaped portions 23 come together at two points in the annular passageway 180 degrees apart. There the kidney-shaped ducts are joined as shown at 24 and 25. Immediately in front of these joints are formed conduits, muffs or boxes 26 into which air is led through pipes 27 from the compressor. These boxes 26 are V-shaped or curved backward in horizontal cross-section and the air escapes from the open ends at the rear of the boxes into the kidney-shaped portions 23 of the dividing ducts.

The arrangement illustrated in FIGURES 12, 13 and 14 is very similar to that illustrated in FIGURES 1 to 5 and the like parts have like numbering. The two prongs of the fork 14 and 15 into which the pipe 11 is divided are not completely separated but form two intersecting circles as shown in FIGURE 13. The cusps where the circles intersect are joined by a series of straps 28 and 29 which thus form the junction between the two pipes and divide the stream into two where it passes over them.

A muff 30 is provided having a part immediately upstream of the strap 28 and having forwardly projecting parts 31 which trap the cool air entering through the pipe 12 and flowing along the edges of the jet pipe. Part of the air so trapped flows over the leading edge of strap 28 and out at the sides to join the gas stream, while a part continues along the top and bottom of the muff through the passageways shown at 32 and into a part 33 immediately upstream of strap 29 to flow over the leading edge of strap 29 and so out into the gas stream. This pathway of the cooling air is shown by arrows illustrated in FIGURES 12 and 14.

What I claim is:

1. An exhaust system for a gas turbine engine having an air compressor, flame tubes and a turbine, said system comprising a single, thin-walled duct connected to receive at its up-stream end exhaust gases from said turbine, said duct being forked at its downstream end to form a thin walled pair of ducts, and in which adjacent thin walls of said pair of ducts have a junction presenting a thin edge directly facing and in the main path of the hot gas stream issuing from the single duct for dividing it, means for protecting and cooling said junction comprising a heat shielding muff shaped in elevation to parallel said junction and so shaped in cross-section and positioned upstream of said junction as to encompass the edge thereof in spaced relation and having side walls overlapping and spaced from the forked duct walls downstream of said junction, means to supply cooling air from said compressor to the space between the muff and junction whereby said air is caused to flow over said junction and the adjacent walls of the pair of ducts and is discharged into the gas stream.

2. Cooling means as claimed in claim 1 for a gas turbine engine in which said first duct is annular and merges into the pair of ducts so as to afford two junctions of the adjacent walls of the pair of ducts which are substantially diametrically opposed with respect to the annulus comprising a pair of muffs one adjacent to and upstream of each junction.

3. Cooling means as claimed in claim 2 wherein each of said muffs comprises a substantially V-shaped box supported between the inner and outer walls of said annular duct immediately adjacent to and upstream of each junction, and also comprising a pair of conduits each connected to communicate with the space between one of the muffs and the respective junction, and connected at its other end to the compressor source of cooling air.

4. An exhaust system for a gas turbine engine having an air compressor, flame tubes, a turbine and an annular by-pass duct the upstream end of which latter is connected to the compressor of the engine to receive relatively cool air therefrom, said system compresing a single, thin-walled circular exhaust duct coaxial with said by-pass duct and arranged to receive at its upstream end exhaust gases from said turbine surrounded by air from said by-pass duct, said exhaust duct being forked at its downstream end to form a thin walled pair of ducts having a junction presenting a thin arc-shaped edge directly facing and in the main path of the hot gas stream issuing from the single duct for dividing it, means for protecting and cooling said junction comprising a heat shielding muff shaped in elevation to substantially parallel said junction and so shaped in cross-section and positioned immediately upstream of said junction as to encompass the edge thereof in spaced relation and having sidewalls overlapping and spaced from the forked duct walls downstream of said junction, said muff having inlet openings at its ends disposed in the stream of air from the by-pass duct to receive cooling air therefrom, said muff having outlet means adjacent to the junction of the pair of ducts.

5. An exhaust system for a gas turbine engine having an air compressor, flame tubes and a turbine, said system comprising a single, thin-walled duct connected to receive at its up-stream end exhaust gases from said turbine, said duct being forked at its downstream end to form a thin-walled pair of ducts, and in which adjacent thin walls of said pair of ducts have a junction presenting a thin edge directly facing and in the main path of the hot gas stream issuing from the single duct for dividing it, means for protecting and cooling said junction comprising a heat shielding muff shaped in elevation to parallel said junction and so shaped in cross-section and positioned upstream of said junction as to encompass the edge thereof in spaced relation and having side walls overlapping and spaced from the forked duct walls downstream of said junction, means to supply cooling air from said compressor through the two ends of the muff to the space between the muff and junction, means to exhaust said air through the center portion of said muff and cause it to flow over said junction and the adjacent walls of the pair of ducts, each end portion of the muff having a plate extending between the side walls thereof in advance of said junction forming a closed conduit section.

References Cited in the file of this patent

UNITED STATES PATENTS

| | | |
|---|---|---|
| 2,236,426 | Faber | Mar. 25, 1941 |
| 2,541,108 | Sforzini | Feb. 13, 1951 |
| 2,633,703 | Tenney et al. | Apr. 7, 1953 |
| 2,641,422 | Oulianoff et al. | June 9, 1953 |
| 2,651,173 | Kennedy | Sept. 8, 1953 |
| 2,693,082 | Arthur | Nov. 2, 1954 |
| 2,748,564 | Marchal et al. | June 5, 1956 |

FOREIGN PATENTS

| | | |
|---|---|---|
| 585,557 | Great Britain | Feb. 11, 1947 |
| 588,847 | Great Britain | June 4, 1951 |